US 8,205,283 B1

(12) United States Patent
Russell

(10) Patent No.: US 8,205,283 B1
(45) Date of Patent: Jun. 26, 2012

(54) TRAVEL FACE PILLOW

(76) Inventor: Steven A Russell, San Francisco, CA (US)

( * ) Notice: Subject to any disclaimer, the term of this patent is extended or adjusted under 35 U.S.C. 154(b) by 29 days.

(21) Appl. No.: 12/898,067

(22) Filed: Oct. 5, 2010

Related U.S. Application Data

(60) Provisional application No. 61/250,505, filed on Oct. 10, 2009.

(51) Int. Cl.
*A47C 20/00* (2006.01)
(52) U.S. Cl. .......... 5/636; 5/630; 5/638; 5/646; 5/652.1
(58) Field of Classification Search ............. 5/630, 632, 5/636, 638, 646, 652, 652.1; 2/17, 91, 203, 2/208
See application file for complete search history.

(56) References Cited

U.S. PATENT DOCUMENTS

| | | | | | |
|---|---|---|---|---|---|
| 1,326,875 | A | * | 12/1919 | Miller | 2/208 |
| 2,667,869 | A | * | 2/1954 | Elia | 128/857 |
| 4,488,315 | A | * | 12/1984 | Hoerlein | 2/91 |
| 4,524,464 | A | * | 6/1985 | Primiano et al. | 2/16 |
| 4,683,601 | A | * | 8/1987 | Lagin | 5/652 |
| 5,864,903 | A | * | 2/1999 | Newman | 5/639 |
| 5,878,438 | A | * | 3/1999 | Ragsdale | 2/158 |
| 6,463,608 | B1 | * | 10/2002 | Moe | 5/646 |
| 6,526,612 | B1 | * | 3/2003 | Zarrella | 5/636 |
| 2008/0172793 | A1 | * | 7/2008 | Gagneur et al. | 5/646 |
| 2008/0189863 | A1 | * | 8/2008 | Zappas | 5/636 |
| 2008/0271742 | A1 | * | 11/2008 | Maginness | 128/845 |

* cited by examiner

*Primary Examiner* — William Kelleher
(74) *Attorney, Agent, or Firm* — Gerald R. Prettyman

(57) ABSTRACT

A travel face pillow provides a portable soft cushion for resting while supporting the head. The travel face pillow may comprise a face support pillow having a left hand pillow and a right hand pillow with the left hand pillow and a right hand pillow centered approximately 180 degrees from each other with the face support pillow surrounding a face opening, a head opening surrounding the face support pillow wherein the head opening is larger than the face opening, a pair of hand entrance slots extending between the head opening and the face opening with each of the pair of hand entrance slots aligned for providing hand access to one of a pair of hand pockets wherein each of the pair of hand pockets is adjacent to a one of the left hand pillow and the right hand pillow respectively, and a pair of thumb cushion tabs coupled to the face support pillow at the head opening with each one of the pair of thumb cushion tabs coupled and aligned respectively to one of the pair of hand pockets for receiving, and an outer surface surrounding the face support pillow.

18 Claims, 4 Drawing Sheets

TRAVEL FACE PILLOW

CROSS-REFERENCE TO RELATED APPLICATIONS

This application claims the benefit of priority of U.S. Provisional Application Ser. No. 61/250,505, titled "Travel Pillow", filed Oct. 10, 2009, which is hereby incorporated by reference.

BACKGROUND OF THE INVENTION

1. Field of the Invention

This invention pertains to a portable pillow, and particularly to a pillow for supporting the head to rest while seated.

2. Description of the Prior Art

To rest while in transit travelers generally have to suffer the incompatible design of chairs designed for sitting upright or slightly reclined, inflate uncomfortable neck collars, or lug large and bulky pillows that are unsuitable for tight quarters typical of air travel or mass transit. Inflatable pillows are also inconvenient to inflate before use and must be deflated before stowage.

SUMMARY OF THE INVENTION

Exemplary embodiments of the travel face pillow provide for padding a user's hands to support a person's face while the person is resting in a seated position.

An exemplary travel face pillow comprises a face support pillow having a left hand pillow and a right hand pillow with the left hand pillow and a right hand pillow centered approximately 180 degrees from each other with the face support pillow surrounding a face opening, a head opening surrounding the face support pillow wherein the head opening is larger than the face opening, a pair of hand entrance slots extending between the head opening and the face opening with each of the pair of hand entrance slots aligned for providing hand access to one of a pair of hand pockets wherein each of the pair of hand pockets is adjacent to a one of the left hand pillow and the right hand pillow respectively, a pair of thumb cushion tabs coupled to the face support pillow at the head opening with each one of the pair of thumb cushion tabs coupled and aligned respectively to one of the pair of hand pockets for receiving a thumb of a hand inserted through the a pair of hand entrance slots and into the pair of hand pockets, and an outer surface surrounding the face support pillow.

In some embodiments, the travel face pillow further comprises a chin support pillow.

In some embodiments, the travel face pillow further comprises a forehead support pillow.

In some embodiments, the travel face pillow comprises high-density pliable foam.

In some embodiments, the travel face pillow comprises foam rubber.

In some embodiments, the travel face pillow comprises polyurethane foam.

In some embodiments, the travel face pillow is approximately oval.

In some embodiments, the travel face pillow is approximately round.

In some embodiments, the travel face pillow is approximately conical shape.

In some embodiments, the travel face pillow comprises soft fleece.

In some embodiments, the travel face pillow comprises synthetic fleece.

In some embodiments, the travel face pillow comprises terry cloth.

In some embodiments, the travel face pillow comprises flocked PVC.

In some embodiments, the travel face pillow comprises a pair of thumb cushion tabs striking an angle of approximately 45 degrees relative to a head opening.

In some embodiments, the travel face pillow comprises a filling.

In some embodiments, the filling comprises cotton.

In some embodiments, the filling comprises flocked polyvinyl chloride.

In some embodiments, the filling comprises feathers.

DETAILED DESCRIPTION OF THE INVENTION

Figure 1:
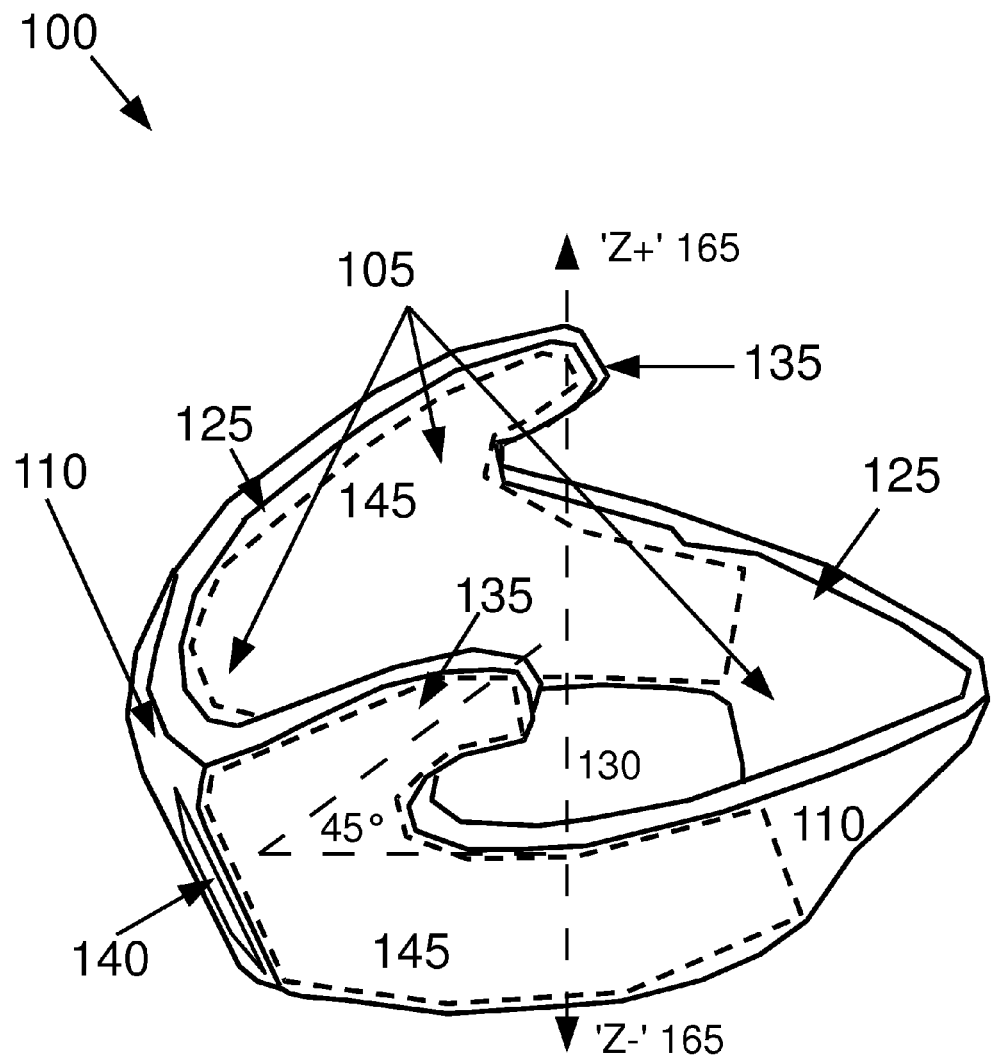
FIG. 1 illustrates an exemplary travel face pillow (100) for padding one's hands to cushion a person's face while the person is resting in a seated position.

FIG. 1 illustrates an exemplary travel face pillow (100) for padding one's hands to cushion a person's face while the person is resting in a seated position.

An exemplary face support pillow (100) as shown in FIG. 1 comprises a face support pillow (105), an outer surface (110), a head opening (125), a face opening (130), a pair of thumb cushion tabs (135), one of a pair of hand entrance slots (140) and a pair of hand pockets (145).

The face support pillow (105) provides padding for a user to cushion her face in her hands and support for the travel face pillow (100). In some embodiments, the face support pillow (105) is a one-piece soft material. In some embodiments, the face support pillow (105) is polyurethane foam. In some embodiments, the face support pillow (105) is visco-elastic polyurethane foam.

In some embodiments, the face support pillow (105) is high-density pliable foam. In some embodiments, the face support pillow (105) is foam rubber. In some embodiments, the face support pillow (105) comprises a plurality of pillows. (See FIG. 2).

The travel face pillow (100) has an outer surface (110). In some embodiments, the outer surface (110) is a natural fabric. The outer surface (110) may be terry cloth cotton. In some embodiments, the outer surface (110) is fleece. The outer surface (110) may be wool or other animal fiber.

In some embodiments, the outer surface (110) may be a synthetic fabric. The outer surface (110) may be polar fleece (i.e., polyethylene terephthalate (PET)) or flocked PVC.

The outer surface (110) may be woven or non-woven. The outer surface (110) may be durable and robust to withstand long-term use.

To fit the travel face pillow (100) around the face, there is a head opening (125) into which the user places her head face-first, and a face opening (130) through which her face protrudes. The head opening (125) is concentrically larger than the face opening (130). The head opening (125) faces, i.e., 'opens' on the 'Z' axis (165) in a direction opposite the face opening (130), i.e., ('Z+' vs. 'Z-').

In some embodiments, the travel face pillow (100) has a circular conical shape. In some embodiments, the travel face pillow (100) has an ovoidal shape.

Coupled to the head opening (125) is a pair of thumb cushion tabs (135). The pair of thumb cushion tabs (135) provides a space within the travel face pillow (100) for a user to place her thumbs. In some embodiments, the pair of thumb cushion tabs (135) is approximately 45 degrees to the head opening (130).

The pair of hand entrance slots (140) are described below.

Within the travel face pillow (100) are a pair of hand pockets (145). The pair of hand pockets (145) allows the user to place her hands within the travel face pillow (100) to cushion her face with the travel face pillow (100).

Figure 2:
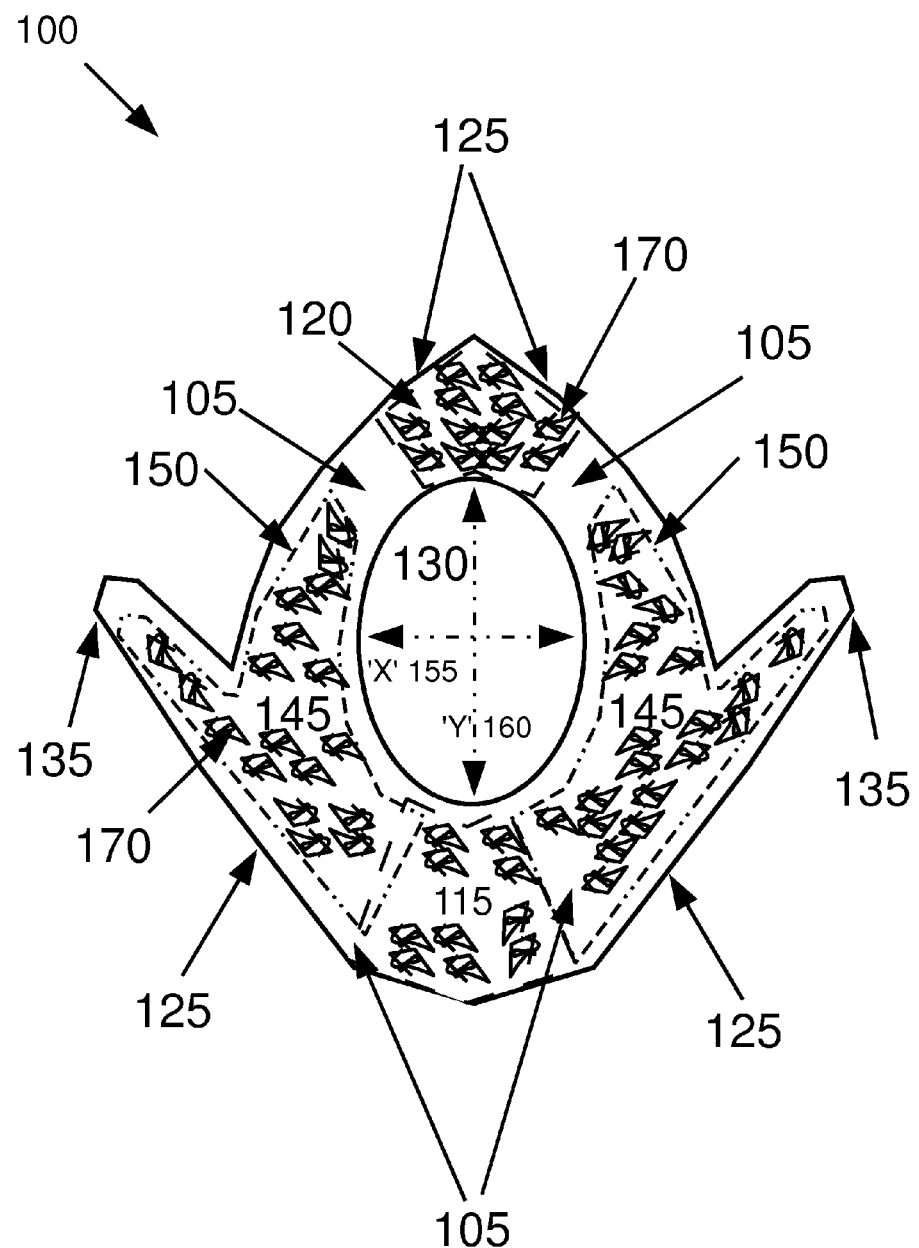
FIG. 2 illustrates an alternate view of the travel face pillow (100) as though the travel face pillow (100) was flat with the outer surface (110) facing away from the viewer.

FIG. 2 illustrates an alternate view of the travel face pillow (100) as though the travel face pillow (100) was flat with the outer surface (110) facing away from the viewer. Shown in FIG. 2 are the face support pillow (105), a chin support pillow (115), a forehead support pillow (120), the head opening (125, in outline), the face opening (130), the pair of thumb cushion tabs (135), the pair of hand pockets (145), a left-hand and right-hand pillow (150), and a pillow filling (170).

The 'X' axis (155) and 'Y' axis (160) shown in FIG. 2 form a plane (the X-Y plane) to demonstrate the general configuration of the travel face pillow (100) and the face support (105). An exemplary face support pillow (105) is generally oval to provide a comfortable fit for the head and face. In some embodiments, the travel face pillow (100) and the face support pillow (105) may be approximately round (as viewed on the X-Y plane) for people with a rounder head.

In some embodiments, the face support pillow (105) comprises a chin support pillow (115). In some embodiments, the face support pillow comprises a forehead support pillow (120). Where both are present, the chin support pillow (115) is approximately 180 degrees from the forehead support pillow (120).

The chin support pillow (115) may be polar fleece, or may be terry cloth cotton. The chin support pillow (115) may be polyurethane foam, visco-elastic polyurethane (memory) foam, or high-density pliable foam. In some embodiments, the chin support pillow (115) comprises a filling (170) inside the chin support pillow (115). In some embodiments, the filling (170) may comprise cotton. In some embodiments, the filling (170) may comprise flocked PVC. In some embodiments, the filling (170) may comprise feathers.

The forehead support pillow (120) may be polar fleece, or may be terry cloth cotton. The forehead support pillow (120) may be polyurethane foam, visco-elastic polyurethane (memory) foam, or high-density pliable foam. In some embodiments, the forehead support pillow (120) comprises a filling (170) inside the chin support pillow (115). In some embodiments, the filling (170) may comprise cotton. In some embodiments, the filling (170) may comprise flocked polyvinyl chloride (PVC). In some embodiments, the filling (170) may comprise feathers.

In some embodiments, the face support pillow (105) may comprise a left-hand pillow and a right-hand pillow (150). The left-hand pillow and right-pillow (150) are on opposite sides of the face opening (130) from each other and centered approximately 90 degrees from the chin support pillow (115) or the forehead support pillow (120).

The left-hand pillow and the right-hand pillow (150) may be polar fleece, or may be terry cloth cotton. The left-hand pillow and the right-hand pillow (150) may be polyurethane foam, visco-elastic polyurethane (memory) foam, or high-density pliable foam.

In some embodiments, the left-hand pillow and the right-hand pillow (150) comprise a filling (170) inside the face support pillow (105). In some embodiments, the filling (170) may comprise cotton. In some embodiments, the filling (170) may comprise flocked PVC. In some embodiments, the filling (170) may comprise feathers.

The pair of hand pockets (145) lay within the travel face pillow (100). Where present, the left-hand pillow and the right-hand-pillow (150) are adjacent to the respective hand pocket (145) with the hand pocket 145 adjacent to the outer surface. A user may then hold her respective left or right hand in place to the respective left or right hand pillow (150) against her respective left or right chin.

In some embodiments, the pair of hand pockets (145) provides a mitten-like pocket for the user's hands within the face support pillow (105). In some embodiments, the pair of the hand pockets (145) may include finger placements, much like a glove.

In some embodiments, the pair of hand pockets (145) may be made of terry cloth. In some embodiments, the pair hand pockets (145) may be made of synthetic fleece. In some embodiments, the pair hand pockets (145) may be woven or non-woven.

Figure 3:
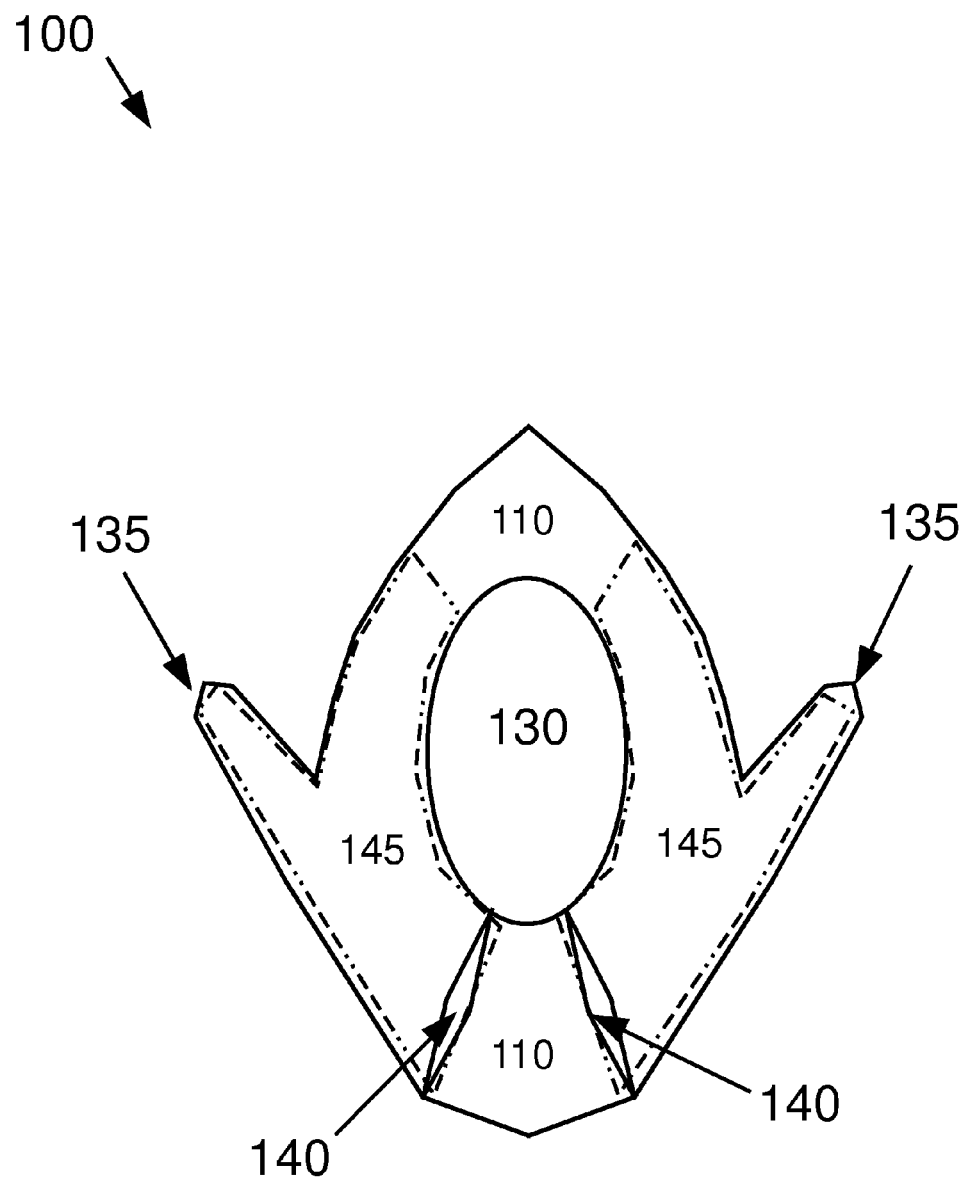
FIG. 3 illustrates an alternate view of the travel face pillow (100) as though the travel face pillow (100) was flat with the outer surface (110) facing toward from the viewer.

FIG. 3 illustrates an alternate view of the travel face pillow (100) as though the travel face pillow (100) was flat with the outer surface (110) facing toward from the viewer. FIG. 3 shows the outer surface (110), the face opening (130), the pair of thumb cushion tabs (135), a pair of hand entrance slots (140) and the outline of the hand pockets (145) within the travel face pillow (100).

On the outer surface (110) is a pair of hand entrance slots (140). Each of the pair of hand entrance slots (140) permit a hand inside the travel face pillow into one of the pair of hand pocket (145). Each of the pair of hand entrance slots (140) is on either side of the chin support pillow (115) adjacent to the left-hand pillow and the right-hand pillow (150) respectively, and run from approximately the head opening (125, not shown) to the face opening (130). Each of the pair of hand entrance slots (140) is sized to accommodate a user's hands entering the travel face pillow (100) to the pair of hand pockets (145). A user may place her hands into the pair of hand entrance slots (140), and with the user's hands inside the pair of hand pockets (145) and the user's thumbs inside the pair of thumb cushion tabs (135). In this way, a user can support her head in padded comfort while resting.

The pair of hand pockets (145) is within the travel face pillow (100). As with hands, each of the pair of hand pockets (145) is a minor image of the other, and is aligned and sized to accommodate a user's left hand or right hand. As FIG. 3 shows the travel face pillow with the outer side (110) towards the viewer, the left side as shown accommodates the right hand, while the right side accommodates the left hand.

The travel face pillow (100) may comprise a one-piece construction such that the pair of hand entrance slots (140) is a pair of void entrances.

Figure 4:
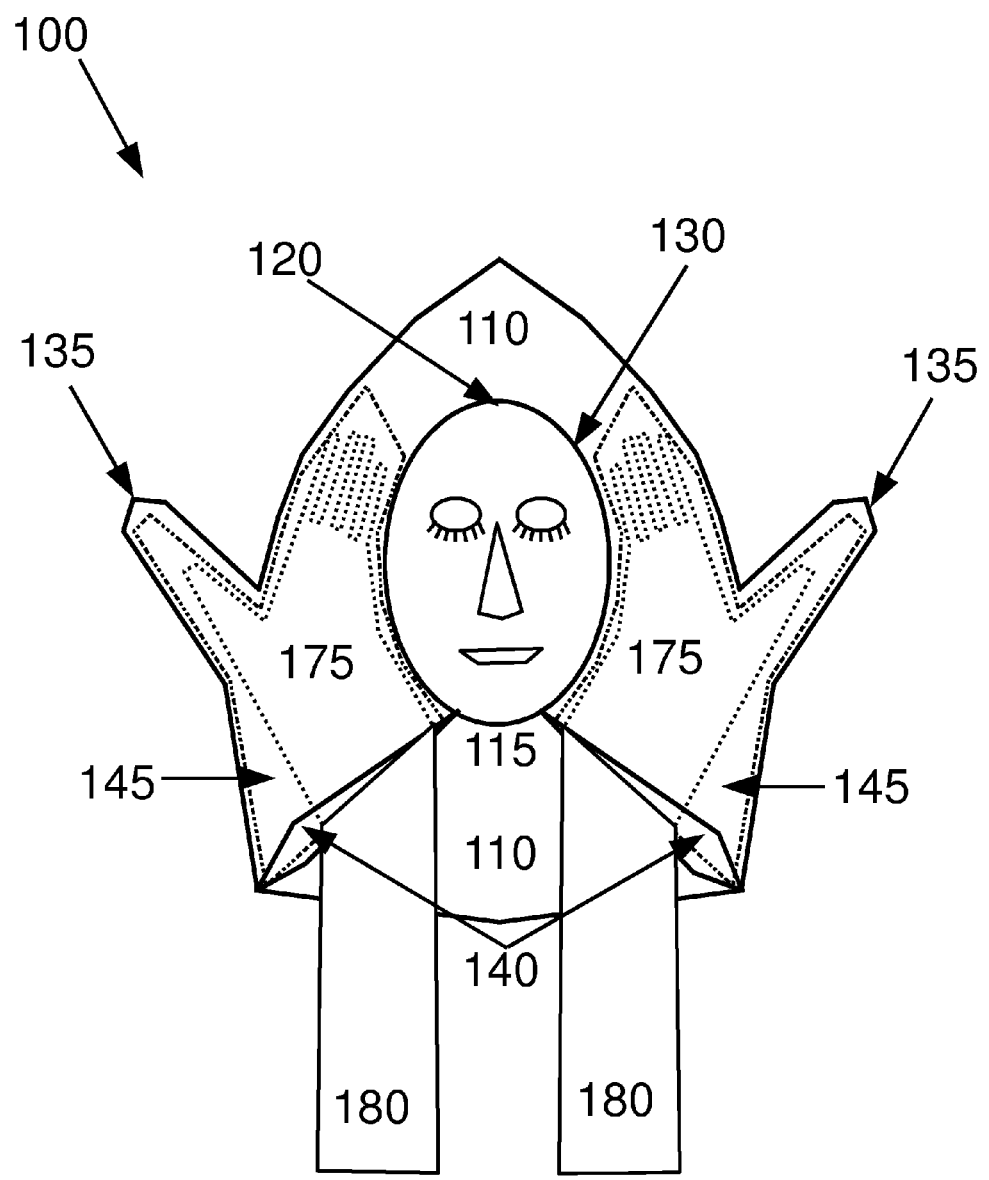
FIG. 4 illustrates one example of the travel face pillow (100) in use for padding hands to cushion a person's face while the person is resting in a seated position.

FIG. 4 illustrates one example of the travel face pillow (100) in use for padding hands to support a person's face while the person is resting in a seated position. As shown in FIG. 4, a person places her face in the face opening (130) with the person's chin against the chin support pillow (115) and her forehead against the forehead support pillow (120). The person places her hands (175) through the pair of hand entrance slots (140) such that the hands are in the pair of hand pockets (145), with her thumbs in the pair of thumb cushion tabs (135). Her arms (180) project out of the pair of hand entrance slots (140) and to support her head on any available surface (not shown).

In this embodiment, the person may comfortably rest with her head supported by her hands and arms, with her hands padded by the exemplary travel face pillow (100).

The embodiments discussed herein are illustrative of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

I claim:

1. A travel face pillow for padding hands to cushion a person's face while the person is resting in a seated position comprising:
    a face support pillow having a left hand pillow and a right hand pillow with the left hand pillow and a right hand pillow centered approximately 180 degrees from each other with the face support pillow surrounding a face opening;
    a head opening surrounding the face support pillow wherein the head opening is larger than the face opening;
    a pair of hand entrance slots extending between the head opening and the face opening with each of the pair of hand entrance slots aligned for providing hand access to one of a pair of hand pockets wherein each of the pair of hand pockets is adjacent to a one of the left hand pillow and the right hand pillow respectively;
    a pair of thumb cushion tabs coupled to the face support pillow at the head opening with each one of the pair of thumb cushion tabs coupled and aligned respectively to one of the pair of hand pockets for receiving a thumb of a hand inserted through the a pair of hand entrance slots and into the pair of hand pockets, and
    an outer surface surrounding the face support pillow.

2. The travel face pillow for padding hands to cushion a person's face while the person is resting in a seated position of claim 1 wherein the face support pillow further comprises a chin support pillow.

3. The travel face pillow for padding hands to cushion a person's face while the person is resting in a seated position of claim 1 wherein the face support pillow further comprises a forehead support pillow.

4. The travel face pillow for padding hands to cushion a person's face while the person is resting in a seated position of claim 1 wherein the face support pillow is high-density pliable foam.

5. The travel face pillow for padding hands to cushion a person's face while the person is resting in a seated position of claim 1 wherein the face support pillow comprises foam rubber.

6. The travel face pillow for padding hands to cushion a person's face while the person is resting in a seated position of claim 1 wherein the face support pillow comprises polyurethane foam.

7. The travel face pillow for padding hands to cushion a person's face while the person is resting in a seated position of claim 1 wherein the face support pillow is approximately oval.

8. The travel face pillow for padding hands to cushion a person's face while the person is resting in a seated position of claim 1 wherein the face support pillow is approximately round.

9. The travel face pillow for padding hands to cushion a person's face while the person is resting in a seated position of claim 1 wherein the travel face pillow has an approximately conical shape.

10. The travel face pillow for padding hands to cushion a person's face while the person is resting in a seated position of claim 1 wherein the outer surface comprises soft fleece.

11. The travel face pillow for padding hands to cushion a person's face while the person is resting in a seated position of claim 1 wherein the outer surface comprises synthetic fleece.

12. The travel face pillow for padding hands to cushion a person's face while the person is resting in a seated position of claim 1 wherein the outer surface comprises terry cloth.

13. The travel face pillow for padding hands to cushion a person's face while the person is resting in a seated position of claim 1 wherein the outer surface comprises flocked polyvinyl chloride.

14. The travel face pillow for padding hands to cushion a person's face while the person is resting in a seated position of claim 1 wherein the pair of thumb cushion tabs strike an angle of approximately 45 degrees relative to the head opening.

15. The travel face pillow for padding hands to cushion a person's face while the person is resting in a seated position of claim 1 wherein the face support pillow comprises a filling.

16. The travel face pillow for padding hands to cushion a person's face while the person is resting in a seated position of claim 15 wherein the filling comprises cotton.

17. The travel face pillow for padding hands to cushion a person's face while the person is resting in a seated position of claim 15 wherein the filling comprises flocked polyvinyl chloride.

18. The travel face pillow for padding hands to cushion a person's face while the person is resting in a seated position of claim 15 wherein the filling comprises feathers.

\* \* \* \* \*